United States Patent [19]

Berquier

[11] Patent Number: 5,389,427
[45] Date of Patent: Feb. 14, 1995

[54] NON-WETTABLE GLASS SHEET

[75] Inventor: Jean-Marc Berquier, Deuil-la-Barre, France

[73] Assignee: Saint-Gobain Vitrage International, Courbevoie, France

[21] Appl. No.: 185,406

[22] Filed: Jan. 24, 1994

Related U.S. Application Data

[63] Continuation of Ser. No. 45,088, Apr. 12, 1993.

[30] Foreign Application Priority Data

Apr. 10, 1992 [FR] France .............................. 92 04463

[51] Int. Cl.$^6$ ............................................. B32B 3/00
[52] U.S. Cl. ..................................... 428/210; 427/299; 427/352; 427/353; 428/220; 428/429; 428/447
[58] Field of Search ............... 427/299, 352, 353, 387, 427/389.7, 389.8; 428/210, 220, 429, 447

[56] References Cited

U.S. PATENT DOCUMENTS

| | | | |
|---|---|---|---|
| 3,859,320 | 1/1975 | Atherton | 427/387 X |
| 4,125,673 | 11/1978 | Roth et al. | 427/387 X |
| 4,997,684 | 3/1991 | Franz et al. | 427/389.7 X |
| 5,071,709 | 12/1991 | Berquier et al. | 428/447 |

FOREIGN PATENT DOCUMENTS 0352180  1/1990  European Pat. Off. .
0492545  7/1992  European Pat. Off. .

OTHER PUBLICATIONS

Chemical Abstracts, vol. 100, No. 12, Mar., 1984, AN-90244t, p. 280, JP-A-58 167448, Oct. 3, 1983.
Chemical Abstracts, vol.100, No. 12, Mar., 1984, AN 90250s, pp. 281, JP-A-58 172246, Oct. 11, 1983.
Patent Abstracts of Japan, vol. 8, No. 65, (p. 263)(1502) Mar. 27, 1984, JP-A-58211, 701, Dec. 9, 1983.

Primary Examiner—Michael Lusignan
Attorney, Agent, or Firm—Oblon, Spivak, McClelland, Maier & Neustadt

[57] ABSTRACT

The present invention concerns a non-wettable glass sheet comprising a hydrophobic, oleophobic, UV resistant layer and a process for manufacturing the same. The process in accordance with the present invention includes cleaning the glass sheet, contacting the glass sheet with a solution containing a fluorinated organosilane in a non-polar solvent system at a temperature ranging between −10° C. and 25° C. for at least 5 minutes, and rinsing.

23 Claims, No Drawings

NON-WETTABLE GLASS SHEET

This is a continuation, of application Ser. No. 08/045,088, filed on Apr. 12, 1993.

BACKGROUND OF THE INVENTION

1. Field of the Invention

The present invention concerns a non-wettable glass sheet which is resistant to UV-radiation, and a process for the manufacture thereof. A "non-wettable" glass sheet is a glass sheet to which liquids do not adhere. The present glass sheets are useful, for example, in vehicles and buildings.

2. Discussion of the Background

Glass sheets which do not frost over are known; for example, from the French patent application published under U.S. Pat. No. 2,635,319. This publication presents a glass sheet coated with a hydrophobic layer obtained by applying a solution containing an organosilane with a hydrocarbon chain on the suitably-prepared glass. These glass sheets have a clearly marked hydrophobic nature. For certain applications, however, the treatment of the glass sheets appears to be insufficiently resistant. This is specifically observed in certain cases when the glass sheet is subjected to an intense exposure to UV radiation, specifically to type B UV radiation, which may occur when the glass sheets are intended for use in aviation.

U.S. Pat. No. 4,983,459 proposes a glass sheet having a hydrophobic nature and on which the effects of friction are minimized through forming on the surface to be treated a coating obtained from a mixture of perfluoroalkyl alkyl silane and a fluorinated olefin telomer. Again in this case, the properties of the glass sheet do not appear adequate for an extended use.

SUMMARY OF THE INVENTION

Accordingly, one object of the present invention is to provide a novel non-wettable glass sheet which offers increased resistance to abrasion and to UV radiation.

This and other objects which will become apparent from the following detailed discussion of the preferred embodiments, have been provided by a non-wettable glass sheet, prepared by a process comprising the following steps:

(a) cleaning the surface of a glass sheet to be coated, (b) contacting the cleaned glass sheet with a solution of a fluorinated organosilane in a non-polar solvent or solvent system for at least 5 min. at a temperature of from $-10°$ C. and $25°$ C., and (c) rinsing the glass sheet.

DETAILED DESCRIPTION OF THE PREFERRED EMBODIMENT

The present glass sheet resists type A UV as well as type B UV. The latter, which are found above the cloud layer, are considered to be particularly damaging to organic compounds. Thus, the present glass sheet may be used particularly advantageously as a glass sheet in the field of aviation.

In accordance with the present invention, such a glass sheet is obtained by treating, in a uniform manner, the surface of a base glass sheet with a solution containing a fluorinated organosilane in a non-polar solvent.

The present process of manufacturing a non-wettable glass sheet comprises the following steps:

(a) cleaning the surface of a glass sheet to be coated, (b) contacting the cleaned glass sheet with a solution of a fluorinated organosilane in a non-polar solvent or solvent system for at least 5 min. at a temperature of from $-10°$ C. and $25°$ C., and (c) rinsing the glass sheet.

The present Inventors have shown that the different steps constituting the present process have a specific effect on the structure of the layer obtained, and therefore, on its properties.

In order to obtain a layer which is simultaneously hydrophobic, oleophobic (oil-repelling), and resistant to abrasion and UV rays, the general structure of the layer is, for each organosilane, one bond covalent at the point of attachment to the base and two bonds covalent with neighboring organosilane molecules through two other hydrolyzable functions. The layer thus formed is a monolayer arranged in polysiloxane patterns in which the organosilanes have been regularly grafted.

The monomolecular layer created has, on "the outside," fluorocarbon chains following a regular arrangement, the end of the chains constituting the outer surface of the coated glass sheet. In accordance with the present invention, at least the carbon atom(s) at the end(s) of the carbon chain(s) are perfluorinated, which gives them not only a particularly marked hydrophobic nature, but also a considerable resistance to aging when the glass sheet is subjected to UV radiation. The presence of fluorine at the end of the chains also makes these glass sheets non-wettable with non-polar liquids. It is clearly understood that the density of the layer and the regularity of the grafting contribute to improving these features. The higher the density of the layer, the more it presents, in a way, a barrier made up of fluorine atoms resistant to UV rays, water and non-polar solvents. Consequently, these glass sheets are very useful in the sense that they do not become soiled (deposits of dust or various stains not adhering), or alternatively, that they are very easily cleaned.

The monomolecular layers in accordance with the present invention are attached to the surface of the glass in a particularly resistant manner by means of bidimensional reticulations. This explains why, although these layers are relatively thin, they offer a special resistance to abrasion. In particular, despite the shocks or impacts exerted on the glass sheet on the occasion of its use, the transparency of the glass sheet is not, or is only slightly, affected by the wearing away of the layer. This is to be compared with the layers of the above-cited art, which combine fluorinated organosilanes and fluorinated olefin telomers. The latter are presumed to counter the effects of abrasion by means of a product serving in a way as a lubricant, but which is not attached in the same manner to the surface of the glass. In a way, the coating is made to be progressively used up, and it is constituted, on the one hand, of elements which are eliminated proportionately. In the experience of the Inventors, this structure, under the effect of mechanical shocks or impacts sustained by the glass sheet, is likely to create an optical blur, impairing the optical qualities of the glass sheet.

By comparison with the monomolecular layers described in French patent publication No. 2,635,319, the improvement in performance is noteworthy. Not only are the layers of the present non-wettable glass sheet simultaneously oleophobic and hydrophobic, but their resistance to UV irradiation is very appreciably enhanced.

Without the invention being bound by this interpretation, this latter property may be compared with the structural features of the layer created, the presence of the fluorines at the end of the chain conferring a substantial chemical inertia on these molecules. In connection with this, it is clear that the presence of fluorine beyond the end of the chain also is a factor which promotes resistance to UV. For this reason, the fluorinated organosilanes used in the present invention have a carbon chain, which may be branched, comprising at least six carbons and, preferably, eight and more carbons. Furthermore, the carbon atom(s) at the end of the carbon chain, or if branched, at the ends of the carbon chains are completely substituted by fluorine atoms. That is, the carbon atom(s) at the end of each carbon chain are "perfluorinated" and each carbon chain contains, for example, at least a $-CF_3$ group at the end of the chain. Thus, the present invention encompasses a non-wettable glass sheet comprising a base and a hydrophobic, oleophobic mono-layer resistant to ultraviolet radiation having a thickness of from 10 to 50 Å, said mono-layer consisting essentially of organosilanes containing $-CF_3$ groups.

The fluorinated organosilanes useful in the present invention correspond to the general formula (I):

$$X_3Si-[C_{a+m}H_{2n}F_{2m}]-CF_3 \qquad (I)$$

in which:

(n+m) is equal to or greater than 5, and preferably, is from 5 to 20, and

X is a hydrolyzable functional group; preferably halogen, and particularly preferably a chlorine atom.

Advantageously, the organosilanes in accordance with the present invention have a highly fluorinated chain; preferably, for example, where n=2 and m is from 3 to 18 in the preceding formula.

Preferred examples of organosilanes for the implementation of the present invention are, specifically, tridecafluorotetrahydrooctyltrichlorosilane, having the formula:

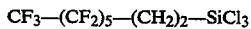
$$CF_3-(CF_2)_5-(CH_2)_2-SiCl_3$$

and heptadecafluorotetrahydrodecyltrichlorosilane, having the formula:

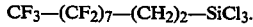
$$CF_3-(CF_2)_7-(CH_2)_2-SiCl_3.$$

The organosilanes of the formula (I) above bind to the base through surface reactive sites on the base. When the conditions for implementation are appropriately selected, so-called "monomolecular" bidimensional layers form on the glass.

Bases amenable to being covered with a coating in accordance with the invention may be made of glass, obtained, for example, through the "floated" glass process. The present glass sheets may be treated by thermal or chemical tempering. The present Inventors have shown that a glass sheet, made up principally of a glass base having undergone a thermal or chemical tempering, also has good properties. The glass base also may be covered in advance with a mineral coating; for example, a metallic coating or a metallic oxide coating, such as zinc oxide, ITO, or $SnO_2$. The coating may be applied, for example, by pyrolysis or under vacuum. The glass sheets in accordance with the present invention also may be made up of a plastic base coated with a layer of silica or a mineral coating as described above.

In order to form the coatings in accordance with the present invention, the base must have been cleared in advance of any elements likely to hinder a good attachment of the organosilanes. In particular, carbon elements deposited and absorbed on the surface of the base are likely to compete with the organosilanes vis-á-vis the reactive sites on the base. It is important that such carbon elements be removed from the surface of the base.

The cleaning of the base is an important step, for it determines the number of reactive sites on the glass amenable to reacting with the organosilanes intended to form a non-wettable layer. The greater this number, the greater the number of organosilanes grafting onto the base and the more solidly attached to the base and the more "compact" the layer will be.

The purpose of the cleaning is to eliminate all contamination, essentially organic, adsorbed on the surface of the base interfering with a possible subsequent grafting of the organosilanes onto the reactive sites on the base. The present Inventors have specifically shown that a value in excess of 25 atomic percent of carbon present on the surface of the glass to a depth of 50 Å is detrimental to the quality of the subsequent grafting. Thus, cleaning is preferentially conducted sufficiently to provide a carbon ratio below 25 atomic percent on a thickness of approximately 50 Å of the surface of the glass sheet to be coated. Furthermore, cleaning may also advantageously reactivate the base.

The cleaning step comprises, preferably, at least one washing of the base in a solution containing an emulsifier, at least one rinsing of the base, preferably with deionized water and/or ethanol, and at least one drying step. Cleaning may also advantageously comprise a polishing step. After drying, the base or glass sheet may be washed with a polar solvent, specifically a chlorinated solvent. Alternatively, and preferably, the base is exposed to an oxidizing atmosphere to improve the reactivation of the glass; for example, to a combination of ozone and UV radiation.

After the cleaning operation, the base is contacted with an organosilane solution in a non-polar solvent solution. Advantageously, during such contacting, the solution is agitated by ultrasonic waves. The temperature of the solution is maintained between $-10°$ C. and $25°$ C. The contact time ranges between 5 and 30 min., advantageously on the order of 10 min. Preferably, contacting takes place in a dry atmosphere; for example, in nitrogen or dry air.

The solution contains an organosilane of the formula (I) described above, the concentration of which varies from $2 \times 10^{-3}$ to $5 \times 10^{-2}$ mol $l^{-1}$, in a non-polar solvent. The choice of the solvent or solvent system is not immaterial and affects the rate of organosilanes grafted onto the base. The solvent is advantageously composed of at least 80% by volume (vol. %) of one or more non-polar solvents, and 20 vol. % or less of one or more chlorinated solvent(s). The non-polar solvent preferably has a carbon chain the length of which is of the same order of magnitude as the carbon chain of the organosilane used. In other words, the number of carbons in the solvent is within two or three carbons of the number of carbons present in the carbon chain in the organosilane (i.e., the non-polar solvent has a number of carbon atoms of from (n+m−3) to (n+m+3)). The non-polar solvent is preferably n-hexadecane or iso-octane; the chlorinated solvent is preferably selected from the group consisting of dichloromethane, trichloromethane, trichloroethane, trichloroethylene, trichlorotrifluoroethane, carbon tetrachloride and mixtures thereof. A particularly preferred system for the implementation of the invention is composed of 80% by volume of iso-octane, 10% by volume of trichloroethane and 10% by volume of trichlorotrifluoroethane.

The base, once contacted with the organosilane solution, may be subjected to baking at a temperature below 100° C. to finish off the grafting. A temperature in excess of 100° C. runs the risk of altering physical properties of the coating. Advantageously, the glass sheet is baked at a temperature of from 50° to 100° C. for a period of at least 45 min. Preferably, the glass sheet is subjected to a temperature of at least 60° C. for at least 60 min. Prolonged baking at such temperatures has no adverse effect on the coated sheets.

The layers thus obtained are monolayers, the thickness of which corresponds to the length of the carbon chain of the organosilane used. The thickness of the monolayer ranges, in accordance with the present invention, between 10 and 50 Å, and preferably between 10 and 30 Å.

The glass sheets thus obtained are simultaneously highly hydrophobic, oleophobic and resistant to UV radiation and abrasion. The present glass sheets may be used in applications requiring anti-rain, anti-frost, anti-stain and/or anti-adherence properties, etc. They are particularly useful for vehicles or for buildings, and more specifically, in the field of aviation.

Other features of the present invention will become apparent in the course of the following descriptions of exemplary embodiments which are given for illustration of the invention and are not intended to be limiting thereof.

The following non-restrictive examples illustrate the following characteristics and advantages of the present invention:

(1) Example 1 shows the improved hydrophobic nature of the present glass sheet, in comparison to an identical glass sheet coated with a non-fluorinated organosilane.

(2) Example 2 shows the improved nature of the resistance to UV rays of the present glass sheet.

(3) Example 3 shows the effect of the makeup of the organosilane and, in particular, of the number of fluorines present in the molecular chain of the organosilane, on its hydrophobic nature.

(4) Example 4 shows the effect of baking on the hydrophobic nature of the coating.

(5) Example 5 shows the resistance to UV (test Q.U.V. FS 40) of the present glass sheets having undergone thermal tempering.

(6) Example 6 shows the resistance to abrasion of glass sheets.

EXAMPLE 1

Six plates of silico-sodo-calcic glass obtained by the "floated" glass process were used as a base.

The surfaces of the glass plates intended to be covered with the coating were cleaned. To this end, the glass plates were tempered in a solution containing 1% of LIQUINOX brand (Aldrich) tensio-active agent (emulsifier) for approximately 30 min. Subsequently, they were rinsed with deionized water and ethanol, then dried with a current of dry nitrogen. The plates were then placed in an enclosure, exposed to ozone and irradiated with ultraviolet light having a wavelength of 190 nm.

The atomic percentage of carbon remaining on the surface of the glass was 15%.

A first solution containing 200 microliters of a silane of the formula $CF_3-(CF_2)_7-(CH_2)_2-SiCl_3$ in 100 ml of a mixture of solvents was prepared. A second solution containing 200 microliters of a silane of the formula $CH_3-(CH_2)_{17}-SiCl_3$ in 100 ml of a mixture of solvents was also prepared. The mixture of solvents, in both cases, was composed of 80 ml of iso-octane, 10 ml of trichloroethane and 10 ml of trichlorotrifluoroethane.

The solutions were maintained at a temperature of 10° C. and were agitated by ultrasound in a dry atmosphere. Three plates were tempered in the first solution in accordance with the present invention, and three other identically-cleaned plates were immersed in the second, comparative solution for a period of 15 min. Ultrasound was applied while the plates were immersed. Subsequently, the plates were rinsed with trichloroethane, then baked for one hour at 60° C.

The angle of contact of a drop of water on the plates immersed in the first solution (representative of the present invention) was 117°, while the angle on the comparative plates (those immersed in the second solution) was 106°.

The thickness of the layer in accordance with the present invention was measured by X-ray reflectometry. The value measured was 14.5 Å, corresponding to the theoretical value.

This example illustrates the improved hydrophobic nature of the layer as well as the perfect grafting realized in accordance with the present invention.

EXAMPLE 2

Five series of plates were prepared by a different process.

Two series of plates (1) and (2) were cleaned and treated in accordance with the process described in Example 1, except that they were not baked. They were immersed, respectively, in the second and first solutions described in Example 1.

Three other series of plates (3), (4) and (5) were cleaned in accordance with the following process:

The plates (3)–(5) were washed twice with two solutions containing a tensio-active agent. Next, they were lightly polished, then rinsed twice with an acid solution and deionized water. Subsequently, they were dried.

They were then immersed in a solution in accordance with the present invention containing 200 microliters of a silane of the formula $CF_3-(CF_2)_7-(CH_2)_2-SiCl_3$ in 100 ml of solvents in a dry atmosphere.

The system of solvents for the plates of series (3) was identical to that described in Example 1. The plates were immersed in the solution, maintained at room temperature for a period of 15 min. without agitation by ultrasound, then the plates were rinsed with trichloroethane.

The system of solvents for the plates of series (4) was an alkane. The plates were immersed in the solution, which was maintained at $-5°$ C. for 15 min. without agitation by ultrasound, then the plates were rinsed.

The plates of series (5) were cleaned and treated similarly to those of series (4), except that the treatment temperature was 0° C.

These plates were subjected to UV radiation at a relative humidity of 65% and a temperature of 60° C. The UV radiation had a strength of 0.35 W m$^2$ and a wavelength of 340 nm. At the end of 28 days, the angle of contact measured was on the order of 100° for the plates of series (3), (4) and (5) in accordance with the present invention. It was on the order of 115° for the plates of series (2) in accordance with the present invention. The angle of contact for the comparative plates of series (1) was on the order of 70°.

This example illustrates the improved resistance to UV radiation of the coatings in accordance with the present invention.

EXAMPLE 3

Six plates were cleaned and treated in accordance with the process described in Example 1.

Three plates were immersed in the first solution of Example 1, and three other plates were immersed in a third solution containing 200 μl of a fluorinated organosilane of the formula $CF_3-(CF_2)_5-(CH_2)_2-SiCl_3$ in 100 ml of a mixture of solvents identical to the mixture of solvents described in Example 1.

The angles of contact measured and averaged were, respectively, 117° for the plates immersed in the first solution and 111° for the plates immersed in third solution.

This example shows that the makeup of the organosilane, and in particular the number of fluorines present in the molecular chain, affects the hydrophobic nature of the organosilane.

EXAMPLE 4

Two series of plates were cleaned and treated in accordance with the process described in Example 1. Both series of plates were immersed in the first solution, in accordance with the present invention.

One series of plates was baked for 1 hour at 60° C.; the other series did not undergo baking.. The angles of contact were respectively 117° on the average and 106° on the average.

This example shows the effect of baking the coating on its hydrophobic properties.

EXAMPLE 5

A series of bases were formed from plates of silicosodo-calcic glass obtained by the "floated" glass process, having undergone thermal tempering.

The plates were cleaned and treated in accordance with the process described in Example 1. They were immersed in the first solution. After a 14-day exposure to UV radiation under particularly severe conditions and in accordance with the test Q.U.V. FS40, the angle of contact fell by 8° (115°-107°).

This example illustrates the advantages of the coating in accordance with the invention, regardless of the makeup of the base.

EXAMPLE 6

Four series of plates were tested with respect to their resistance to abrasion. They were subjected to a test known as Taber, in accordance with ASTM standard D 1044.78. They were abraded by a rotating wheel of the type CS-10F under a pressure of 500 g.

The first three series were cleaned and treated in accordance with series (2), (3) and (4) described in Example 2. A fourth series, designated as series (6), was cleaned and treated like the plates of series (2), except that the solution was not agitated by ultrasound.

The plates of series (7) were subjected to the same cleaning as the plates of series (2), (3) and (4). They were immersed in a solution containing 200 microliters of a fluorinated organosilane in accordance with that used for series (2), (3) and (4) 3 in 100 ml of a mixture of solvents composed of 80% by weight (wt. %) n-hexadecane, 12 wt. % CCl$_4$, and 8 wt. % chloroform for 2 hours at room temperature without ultrasound agitation. The plates were then rinsed with trichloroethane.

At the end of 200 cycles, all the angles of contact measured were as follows:
series (2)=80°,
series (3)=70°,
series (4)=80°,
series (6)=60°,
series (7)=70°.

This example illustrates the resistance to abrasion of the glass sheets in accordance with the present invention, as well as the effect of the implemented process. In particular, the thickness of the plates of series 6, measured by X-ray reflectometry, is less than the theoretical value, which would imply that the organosilanes are not adequately grafted. With respect to the plates of series 7, their thickness, also measured by x-ray reflectometry, is less than 10 Å, which implies that the organosilanes have not been grafted regularly in accordance with the desired polysiloxane patterns. In fact, the layer appears to be composed of organosilanes in some way layered, at least in part, in a plane appreciably parallel to that of the glass.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A process for manufacturing a non-wettable glass sheet having a hydrophobic, oleophobic layer resistant to ultraviolet radiation wherein said layer has a thickness of from 10 to 50 Å, comprising the following steps:
   (A) cleaning the surface of a glass sheet to be coated,
   (B) contacting said glass sheet with a fluorinated organosilane solution consisting of a fluorinated organosilane having the formula:

$$X_3Si-(C_{n+m}H_{2n}F_{2m})-CF_3$$

in which (n+m) is equal to or greater than 5, and X is a hydrolyzable functional group in a non-polar solvent or solvent system of at least 80% by volume of a nonpolar solvent and 20% or less by volume of a chlorinated solvent at a temperature of from −10° C. to 25° C. for at least 5 minutes, and
   (C) rinsing said glass sheet.

2. The process of claim 1, wherein said contacting said glass sheet with said solution containing a fluorinated organosilane is conducted in a dry atmosphere.

3. The process of claim 1, wherein said non-polar solvent has a first carbon chain and said organosilane has a second carbon chain, and said first and second carbon chains are of a length of the same order of magnitude.

4. The process of claim 1, wherein said non-polar solvent is selected from the group consisting of n-hexadecane and iso-octane, and said chlorinated solvent is selected from the group consisting of dichloromethane, trichloromethane, trichloroethane, trichloroethylene, trichlorotrifluoroethane, carbon tetrachloride and mixtures thereof.

5. The process of claim 4, wherein said non-polar solvent system consists essentially of 80% by volume of iso-octane, 10% by volume of trichloroethane, and 10% by volume of trichlorotrifluoroethane.

6. The process of claim 1, wherein said fluorinated organosilane has a carbon chain, which may be branched, comprising at least six carbon atoms, the carbon atom(s) at the end(s) of the carbon chain(s) being perfluorinated.

7. The process of claim 6, wherein said carbon chain of said fluorinated organosilane comprises at least eight carbons.

8. The process of claim 7, wherein said carbon chain of said fluorinated organosilane comprises ten carbons.

9. The process of claim 1, further comprising applying ultrasound during said contacting.

10. The process of claim 8, wherein m is from 3 to 18.

11. The process of claim 10, wherein n is equal to 2.

12. The process of claim 8, wherein X is a chlorine atom.

13. The process of claim 1, further comprising baking said glass sheet at a temperature of from 50° to 100° C. for at least 45 minutes after said rinsing step.

14. The process of claim 13, wherein said baking is performed at a temperature of at least 60° C. for at least one hour.

15. The process of claim 1, wherein said cleaning is conducted sufficiently to provide a carbon ratio below 25 atomic percent on a thickness of approximately 50 Å surface of the glass sheet to be coated.

16. The process of claim 15, wherein said cleaning step comprises at least one washing of the surface to be coated with a tension-active agent, at least one rinsing step and at least one drying step.

17. The process of claim 16, wherein said cleaning step further comprises a polishing step.

18. The process of claim 16, further comprising exposing said glass sheet to ozone and irradiating said glass sheet with ultraviolet light after said drying step.

19. The process of claim 16, further comprising applying ultrasound at a temperature of from 5° to 25° C. during said contacting step, wherein said non-polar solvent contains at least 80% by volume of a non-polar solvent and at least one polar solvent.

20. The process of claim 17, wherein said non-polar solvent consists essentially of a non-polar solvent, and said temperature is from −10° C. to 5° C.

21. A non-wettable glass sheet comprising a base and a hydrophobic, oleophobic mono-layer resistant to ultraviolet radiation and having a thickness of from 10–30 Å, said monolayer consisting essentially of organosilanes selected from the group consisting of tridecafluorotetrahydrooctyltrichlorosilane of the formula $CF_3(CF_2)_5—(CH_2)_2SiCl_3$ and perfluorodecyltrichlorosilane of the formula $CF_3—(CF_2)_7—(CH_2)_2SiCl_3$ regularly grafted into polysiloxane patterns.

22. The non-wettable glass sheet of claim 21, wherein said organosilane is a perfluorodecyltrichlorosilane of the formula $CF_3—(CF_2)_7—(CH_2)_2SiCl_3$.

23. The non-wettable glass sheet of claim 21, wherein said organosilane is tridecafluorotetrahydrooctyltrichlorosilane of the formula $CF_3—(CF_2)_5—(CH_2)_2SiCl_3$.

* * * * *

UNITED STATES PATENT AND TRADEMARK OFFICE
CERTIFICATE OF CORRECTION

PATENT NO. : 5,389,427
DATED : February 14, 1995
INVENTOR(S) : Jean-Marc Berquier It is certified that error appears in the above-indentified patent and that said Letters Patent is hereby corrected as shown below:

Column 3, line 28, the formula should read
  --$X_3Si-[C_{n+m}H_{2n}F_{2m}]-CF_3$--.
Column 7, line 36, "baking.." should read --baking.--

Signed and Sealed this

Sixteenth Day of July, 1996

Attest:

BRUCE LEHMAN

*Attesting Officer*  *Commissioner of Patents and Trademarks*